(12) United States Patent
Xue et al.

(10) Patent No.: US 10,942,048 B2
(45) Date of Patent: Mar. 9, 2021

(54) SENSOR CHIP USED FOR MULTI-PHYSICAL QUANTITY MEASUREMENT AND PREPARATION METHOD THEREOF

(71) Applicant: MultiDimension Technology Co., Ltd., Zhangjiagang (CN)

(72) Inventors: Songsheng Xue, Zhangjiagang (CN); Weifeng Shen, Zhangjiagang (CN); Lixian Feng, Zhangjiagang (CN)

(73) Assignee: MultiDimension Technology Co., Ltd., Zhangjiagang (CN)

( * ) Notice: Subject to any disclaimer, the term of this patent is extended or adjusted under 35 U.S.C. 154(b) by 386 days.

(21) Appl. No.: 15/318,481

(22) PCT Filed: Jun. 12, 2015

(86) PCT No.: PCT/CN2015/081293
§ 371 (c)(1),
(2) Date: Dec. 13, 2016

(87) PCT Pub. No.: WO2015/188772
PCT Pub. Date: Dec. 17, 2015

(65) Prior Publication Data
US 2017/0122783 A1      May 4, 2017

(30) Foreign Application Priority Data

Jun. 13, 2014   (CN) .......................... 201410264349.6

(51) Int. Cl.
*G01D 21/02*      (2006.01)
*G01N 27/22*     (2006.01)
(Continued)

(52) U.S. Cl.
CPC ............... *G01D 21/02* (2013.01); *G01K 7/22* (2013.01); *G01L 9/045* (2013.01); *G01N 27/121* (2013.01);
(Continued)

(58) Field of Classification Search
None
See application file for complete search history.

(56) References Cited

U.S. PATENT DOCUMENTS 4,143,549 A * 3/1979 Koehler .................... G01K 7/24
374/114
4,282,753 A * 8/1981 Davidson ................. G01K 7/20
374/166

(Continued)

FOREIGN PATENT DOCUMENTS

| CN | 1492215 | 4/2004 |
|---|---|---|
| CN | 1217157 | 8/2005 |

(Continued)

OTHER PUBLICATIONS

Translation of CN 1845327 A—Wang et al.*
(Continued)

*Primary Examiner* — Nathaniel T Woodward
(74) *Attorney, Agent, or Firm* — Schwegman Lundberg & Woessner, P.A.

(57) ABSTRACT

A sensor chip is used for multi-physical quantity measurement. This sensor chip comprises a substrate and at least two of the following sensors: a temperature sensor, a humidity sensor, or a pressure sensor, which are integrated onto the same substrate, wherein the pressure sensor consists of electrically interconnected resistive elements. The humidity sensor is an interdigitated structure. Thermistor elements are placed around the pressure sensor and the humidity sensor to form a temperature sensor. The temperature sensor has a (Continued)

resistance adjusting circuit. A microcavity is etched on the back of the substrate in a place on the opposite side pressure sensor's location. Also disclosed is a preparation method for a sensor chip used for multi-physical quantity measurement. This multi-physical quantity measurement single chip sensor chip has the advantages of low cost, low power consumption, easy fabrication, and wide applicability.

13 Claims, 4 Drawing Sheets

(51) Int. Cl.
 G01K 7/22 (2006.01)
 G01L 9/04 (2006.01)
 G01N 27/12 (2006.01)
(52) U.S. Cl.
 CPC ......... *G01N 27/128* (2013.01); *G01N 27/225* (2013.01)

(56) References Cited

U.S. PATENT DOCUMENTS

| | | | | |
|---|---|---|---|---|
| 5,116,136 | A * | 5/1992 | Newman | G01K 7/25 327/512 |
| 5,119,538 | A * | 6/1992 | White | G01K 7/223 29/612 |
| 6,232,875 | B1 * | 5/2001 | DeZorzi | B60C 23/0408 116/34 R |
| 6,354,736 | B1 | 3/2002 | Cole et al. | |
| 7,875,455 | B1 * | 1/2011 | Li | E21B 47/06 422/82.02 |
| 8,710,597 | B1 | 4/2014 | Koury, Jr. | |
| 2004/0132166 | A1 * | 7/2004 | Miller | B01L 3/502707 435/286.1 |
| 2005/0032204 | A1 * | 2/2005 | Rodgers | B01L 3/5027 435/288.5 |
| 2007/0273394 | A1 * | 11/2007 | Tanner | G01P 5/12 324/664 |
| 2008/0084135 | A1 * | 4/2008 | Ramsesh | G01F 1/66 310/313 R |
| 2008/0314118 | A1 | 12/2008 | Bey, Jr. et al. | |
| 2011/0235678 | A1 | 9/2011 | Kurtz et al. | |
| 2013/0087864 | A1 | 4/2013 | Ten | |

FOREIGN PATENT DOCUMENTS

| | | | |
|---|---|---|---|
| CN | 1664510 | | 9/2005 |
| CN | 1725439 | | 1/2006 |
| CN | 1845327 | | 10/2006 |
| CN | 1845327 | A * | 10/2006 |
| CN | 1845327 | A * | 10/2006 |
| CN | 102680018 | | 9/2012 |
| CN | 103438936 | | 12/2013 |
| CN | 103712721 | A | 4/2014 |
| CN | 104034454 | | 9/2014 |
| CN | 203940940 | | 11/2014 |
| JP | H03262923 | | 11/1991 |
| JP | H04328434 | A | 11/1992 |
| JP | H09304127 | | 11/1997 |
| JP | H1019305 | A | 7/1998 |
| JP | 2001272293 | A | 10/2001 |
| JP | 2005297180 | | 10/2005 |
| WO | WO-2015188772 | | 12/2015 |

OTHER PUBLICATIONS

Translation of CN-1845327 (previously provided) (Year: 2006).*
"International Application No. PCT/CN2015/081293, International Search Report and Written Opinion dated Sep. 21, 2015", (Sep. 21, 2015), 15 pgs.
"Chinese Application 201410264349.6, First Office Action dated Aug. 26, 2015", (Aug. 26, 2015), 8 pgs.
"Chinese Application 201410264349.6, Second Office Action dated Jan. 15, 2016", (Jan. 15, 2016), 8 pgs. .
"Chinese Application 201410264349.6, Supplemental Search dated Jan. 7, 2016", (Jan. 7, 2016), 1 pg.
"European Application No. 15806196.0, Extended European Search Report dated Oct. 24, 2017", (Oct. 24, 2017), 27 pgs.
"Japanese Application No. 2017-517174, Notice of Reasons for Refusal dated Mar. 13, 2019", (Mar. 13, 2019), 11 pgs.
Zeng, Huanhuan, et al., "Fabrication and Test of MEMS/NEMs based Polyimide Integrated Humidity, Temperature and Pressure Sensor", (Jan. 18, 2006), 4 pgs.

* cited by examiner

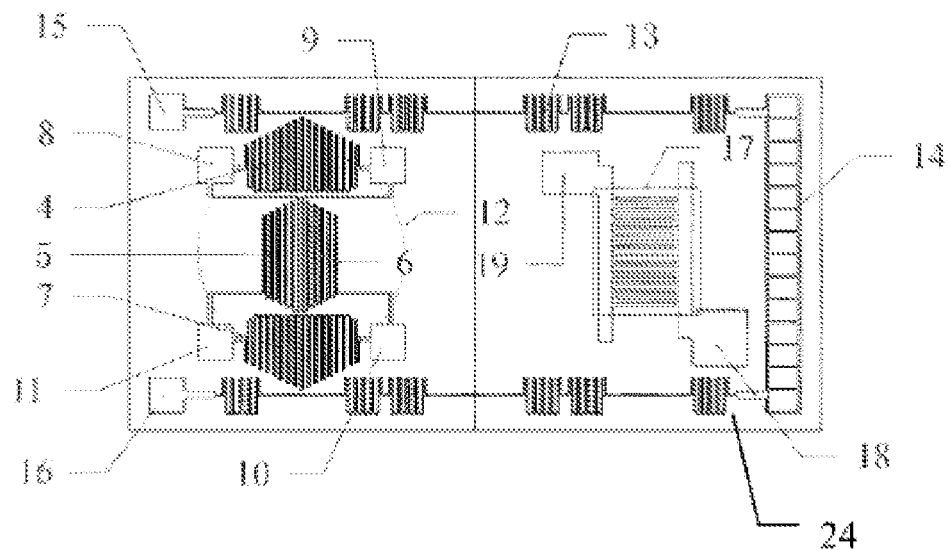
FIG. 1
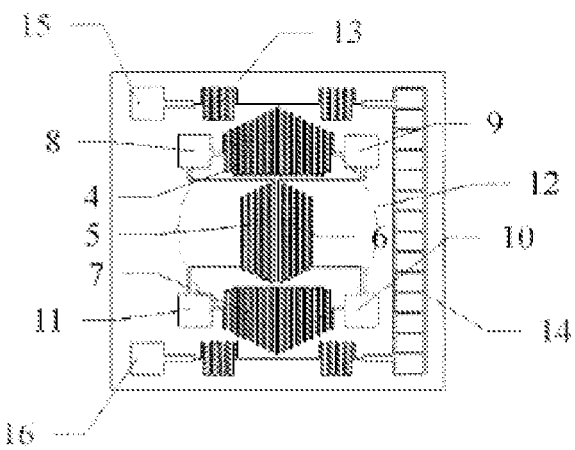 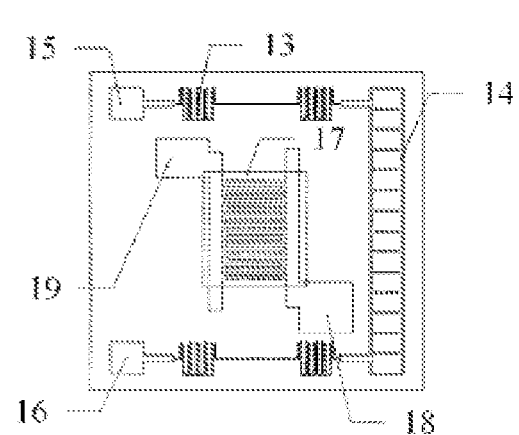
FIG. 2A        FIG. 2B

SENSOR CHIP USED FOR MULTI-PHYSICAL QUANTITY MEASUREMENT AND PREPARATION METHOD THEREOF

PRIORITY CLAIM TO RELATED APPLICATIONS

This application is a U.S. national stage application filed under 35 U.S.C. § 371 from International Application Serial No. PCT/CN2015/081293, which was filed 12 Jun. 2015, and published as WO2015/188772 on 17 Dec. 2015, and which claims priority to Chinese Application No. 201410264349.6, filed 13 Jun. 2014, which applications and publication are incorporated by reference as if reproduced herein and made a part hereof in their entirety, and the benefit of priority of each of which is claimed herein.

TECHNICAL FIELD

The present invention relates to a sensor chip and a preparation method thereof, and in particular, to a sensor chip used for multi-physical quantity measurement and a preparation method thereof.

BACKGROUND ART

Temperature, humidity and pressure are important physical quantities in environmental and atmospheric monitoring, and generally, separated sensors are used to measure these physical quantities. The separated sensors are disadvantageous in large volume and large power consumption, and cannot meet requirements of a current micro-system developed rapidly for a sensor in terms of small volume, low power consumption, and integration level. Therefore, an integrated sensor capable of meeting the requirements is needed.

Currently, there are mainly the following three ways of integrating sensors: (1) integrating a plurality of sensors having identical or similar functions into a one-dimensional or two-dimensional sensor array; (2) integrating sensors and an integrated circuit onto the same chip; and (3) integrating different types of sensors, for example, sensors integrating pressure, temperature, and humidity sensitive units and the like. At present, the method (3) is gradually used domestically to integrate sensors used for measuring temperature, humidity, and pressure. For example, the patent with Authorization Publication No. CN1217157C discloses a chip integrating temperature/humidity and atmospheric pressure sensors. Three resistors and a plate electrode serving as a lower electrode of a pressure measurement capacitor are manufactured on a substrate of the sensor chip, where two resistors are connected in series to form two bridge arms of a bridge, for measuring the absolute humidity, and the other resistor is separately wired, for measuring the temperature. A silicon sheet is bonded to the substrate, a microcavity is etched on the silicon sheet in a place corresponding to the plate electrode and a humidity measurement resistor, and an upper electrode of the pressure measurement capacitor is formed by coating a film in the microcavity in the place corresponding to the plate electrode. A temperature/humidity measurement resistor and the lower electrode of the pressure measurement capacitor are platinum thin films, and the upper electrode of the pressure measurement capacitor is a gold thin film having a thickness of 240 nm, or is formed by depositing a silicon nitride thin film in the cavity. The patent with Authorization Publication No. CN24420021C also discloses a single chip integrating temperature, humidity, and pressure sensors based on a polymer material. In the sensor chip, parallel polar plates and three resistors are manufactured on a substrate, where the parallel polar plates form an electrode of a capacitor for measuring the humidity, the resistors are strain resistors for measuring the pressure and thermistors for measuring the temperature, and a layer of polymer is manufactured on the parallel polar plates and the resistors, to serve as a capacitive humidity sensitive dielectric and an elastic film for sensing the pressure, respectively. A latticed polar plate is disposed on the capacitive humidity sensitive dielectric to serve as the other electrode of the capacitor. The resistors are platinum thin films, the electrode plates are gold or platinum thin films, and the polymer material is a polyimide thin film. The sensor chips disclosed in the above two patents can implement simultaneous measurement on temperature, humidity, and pressure; however, preparation processes are comparatively complicated, elements for measuring humidity and pressure are manufactured by using different thin films, and the thin films are not thin enough. For these metal thin film-type resistive sensors, films are generally thick (>1 μm) to reduce defects due to limits on thin film processes and the like, such that a resistance change rate $\Delta R/R$ is low, and sensitivity is relatively low as compared with other types of sensors, thereby limiting their applications.

SUMMARY OF THE INVENTION

To overcome the defects in the prior art, an improved thin film process is adopted to greatly reduce the amount of impurities and defects in a deposited metal film, thereby implementing an application of an ultra-thin sensitive metal thin film in a sensor, and having advantages such as high resistance, low power consumption, and quick response.

To implement the above objectives, the present invention provides a sensor chip used for multi-physical quantity measurement, including a substrate, at least two of the following sensors a temperature sensor, a humidity sensor, and a pressure sensor that are located at different positions being integrated onto the substrate, a microcavity being further opened at the back of the substrate, and the microcavity being in a place on the opposite side pressure sensor's location;

the pressure sensor including a Wheatstone bridge, the bridge being formed by electrically connecting an even number of first resistive elements;

the temperature sensor including a plurality of electrically connected third resistive elements, wherein a part of the third resistive elements form a resistance adjusting circuit;

the humidity sensor including an even number of second resistive elements forming an interdigitated structure, the interdigitated structure being covered with a hygroscopic material, or, the humidity sensor including an upper electrode plate and a lower electrode plate, the electrode plates being provided with a plurality of apertures, and a humidity sensitive material being filled between the upper and lower electrode plates;

the temperature sensor being located around the pressure sensor and/or the humidity sensor; and the first resistive elements, the second resistive elements, the third resistive elements, and the electrode plates being made of the same material.

Preferably, the Wheatstone bridge is a half bridge or a full bridge.

Preferably, the full bridge includes four first resistive elements, wherein two first resistive elements are correspondingly located at the center of the microcavity, and the other two first resistive elements are correspondingly located at two symmetric edges of the microcavity respectively.

Preferably, the half bridge includes two first resistive elements, wherein the two first resistive elements are correspondingly located at the center and the edge of the microcavity respectively.

Preferably, an ASIC chip is integrated onto the substrate, and the temperature sensor is integrated onto the ASIC chip.

Preferably, the first resistive elements, the second resistive elements, and the third resistive elements are serpentine or spiral; or, the first resistive elements and the third resistive elements are serpentine or spiral, and the electrode plates are square, rectangular, or circular.

Preferably, the material for making the first resistive elements, the second resistive elements, the third resistive elements, and the electrode plates includes a sensitive resistance material thin film, and the sensitive resistance material thin film has a thickness of 500-10000 Å.

Another embodiment of the present invention further provides a preparation method of a sensor chip used for multi-physical quantity measurement, including:

(1) cleaning the surface of a substrate, and depositing a layer of elastic thin film on the substrate;

(2) sputtering a layer of sensitive resistance material thin film on the elastic thin film, patterning the sensitive resistance material thin film into first resistive elements in a pressure sensor, second resistive elements in a humidity sensor, and third resistive elements in a temperature sensor;

(3) adjusting resistances of the third resistive elements to a specified value, then depositing a passivation layer above all the resistive elements, and windowing the passivation layer to expose a coverage position for constructing a connection electrode and coating a hygroscopic material;

(4) grinding the back of the substrate, and etching a microcavity on the back of the substrate in a place on the opposite side pressure sensor's location;

(5) coating a hygroscopic material on the substrate in a place corresponding to the humidity sensor; and (6) constructing a connection electrode and wiring between elements.

Preferably, the back of the substrate is bonded with a glass sheet, to seal the microcavity.

Preferably, a hole is opened on the glass sheet in a place corresponding to the microcavity, to be in communication with an external to-be-measured voltage.

Preferably, the microcavity is vacuum-sealed, or the sealed microcavity is filled with dry air having an atmospheric pressure.

Preferably, the material of the substrate is silicon, gallium arsenide, indium phosphide, aluminum oxide, sapphire, aluminum nitride, silicon carbide, silicon nitride, martensitic precipitation hardening stainless steel (model 17-4PH), Ni-Span, nickel-iron-chromium alloy (model Ni-Span C alloy 902) or high-temperature stainless steel (model X17U4).

Preferably, the material of the elastic thin film includes SiN (silicon nitride), SiOx (silicon oxide), SiOxNy (silicon oxynitride), Al2O3 (aluminium trioxide), SiC (silicon carbide), martensitic precipitation hardening stainless steel (model 17-4PH), Ni-Span, nickel-iron-chromium alloy (model Ni-Span C alloy 902), high-temperature stainless steel (model X17U4), or polyimide.

Preferably, the sensitive resistance material thin film includes AMR, GMR, TMR, platinum, gold, manganese, nickel, nickel-chromium alloy, nickel-gold alloy, nickel-chromium-silicon alloy, lead-chromium alloy, platinum-iridium alloy, doped silicon, polycrystalline silicon, or doped polycrystalline silicon.

Compared with the prior art, the present invention has the following technical effects:

(1) The film is formed once, the preparation process is simple, and thus a single chip used for multi-physical quantity measurement can be implemented.

(2) The present invention has wide applicability, can be applied in various scenarios, and can be customized by a user.

(3) The used metal sensitive material is ultra-thin and has excellent temperature characteristics, such that the sensor chip has greater resistance, lower power consumption, and a reduced cost.

BRIEF DESCRIPTION OF DRAWINGS

In order to explain technical solutions in technologies of embodiments of the present invention more clearly, a brief introduction of drawings to be used for describing the technologies of the embodiments will be made below. Apparently, the drawings described below are merely some embodiments of the present invention, and other drawings can be obtained according to these drawings by persons of ordinary skill in the art without creative labor.

FIG. 1 is a schematic structural diagram of a sensor chip integrating temperature, humidity and pressure measurements according to the present invention;

FIG. 2A-2B are schematic structural diagrams of a sensor chip integrating temperature and pressure measurements and a sensor chip integrating temperature and humidity measurements, respectively;

DETAILED DESCRIPTION OF THE PREFERRED EMBODIMENTS

The present invention will be described in detail below with reference to the accompanying drawings and in combination with the embodiments.

Embodiments

Figure 3:
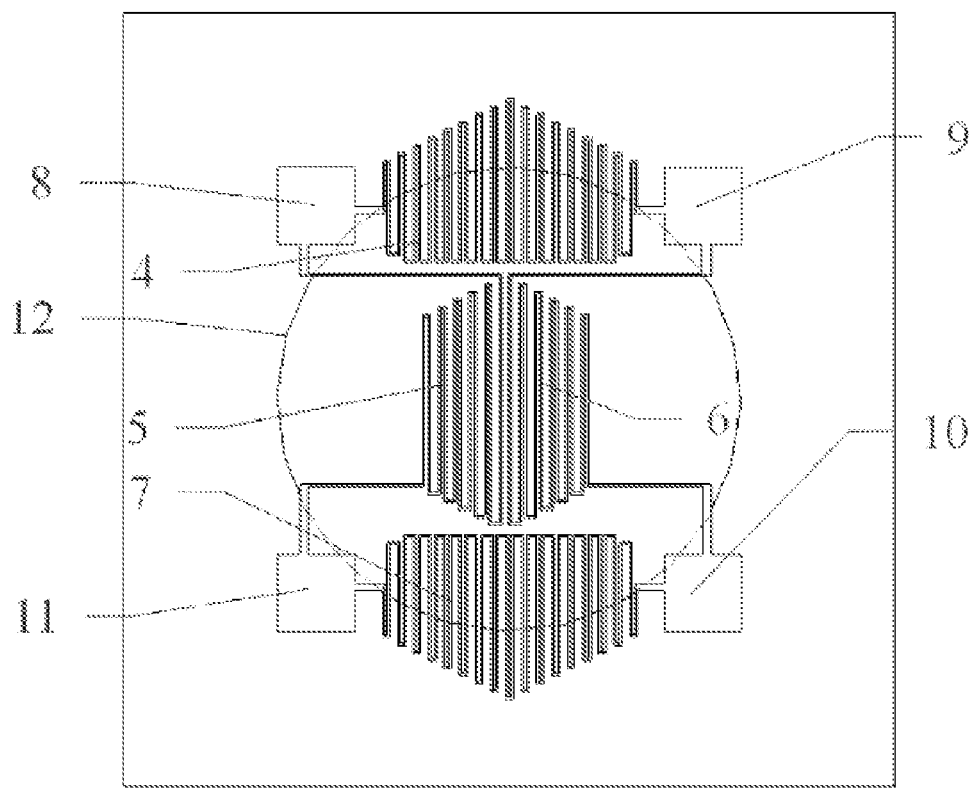
FIG. 3 is a schematic structural diagram of a pressure sensor.

FIG. 1 is a schematic structural diagram of a sensor chip integrating temperature, humidity and pressure measurements according to the present invention. The sensor chip includes a substrate 24 and a pressure sensor, a humidity sensor, and a temperature sensor, which are integrated onto the substrate 24 at different positions. A microcavity 12 is etched on the back of the substrate 24 in a place on the opposite side pressure sensor's location. The microcavity 12 may be vacuum-sealed, and at this point, can be used for measuring an absolute pressure. A gauge pressure may also be measured by filling dry air having an atmospheric pressure inside the microcavity. Moreover, the microcavity 12 may not be sealed, for measuring a differential pressure. The structure of the pressure sensor is as shown in FIG. 3, which includes a Wheatstone bridge. In this example, the Wheatstone bridge is of a full-bridge structure, and formed by electrically connecting four first resistive elements 4-7, where the first resistive elements 5 and 6 are correspondingly located at the center of the microcavity 12, and the first resistive elements 4 and 7 are correspondingly located at upper and lower edges of the microcavity 12. In a preferred embodiment, the microcavity 12 is oval shaped. The full bridge further includes four input and output electrodes 8-11, connected to the first resistive elements 4-7. Moreover, the Wheatstone bridge may also be of a half-bridge structure, and only needs two first resistive elements and three electrodes. The two first resistive elements are correspondingly located at the center and the edge of the microcavity 12, respectively.

Figure 4A:
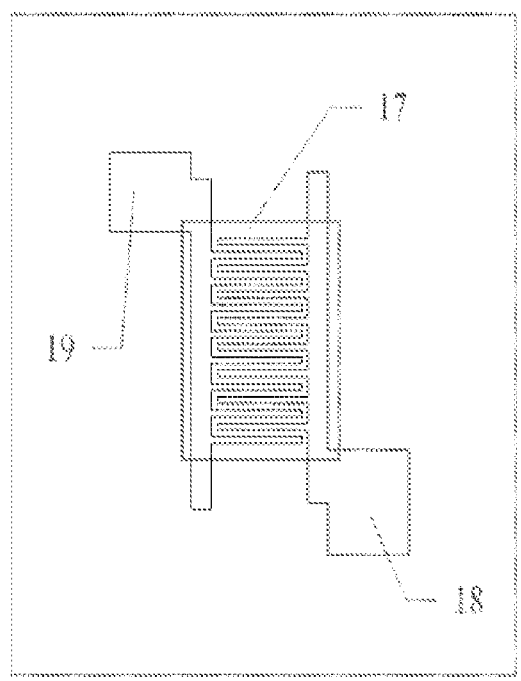
FIG. 4A-4B are two schematic structural diagrams of a humidity sensor.
Figure 4B:
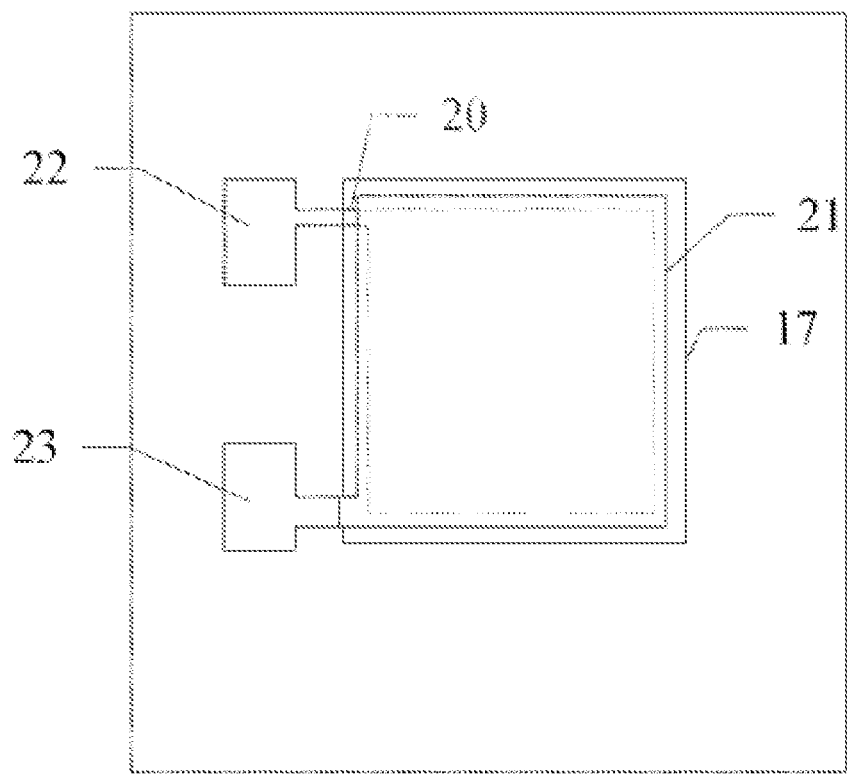

The humidity sensor is an interdigitated structure, as shown in FIG. 4A, and consists of two second resistive elements 18 and 19. A layer of hygroscopic material 17 further covers the two resistive elements from above. Moreover, the humidity sensor may also be a capacitor structure consisting of upper and lower electrode plates 20 and 21, a hygroscopic material 17 is filled between the two electrode plates, and electrodes 22 and 23 are connected to the upper and lower electrode plates 20 and 21 respectively, as shown in FIG. 4B.

Figure 5:
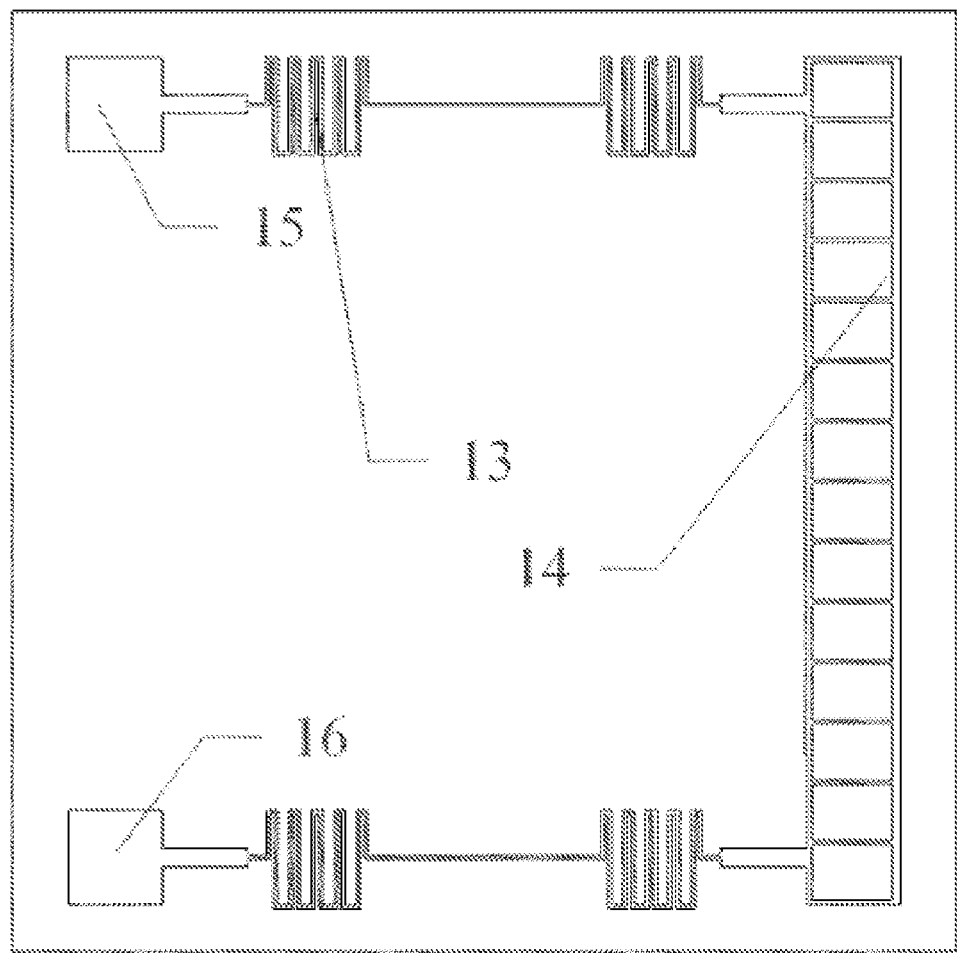
FIG. 5 is a schematic structural diagram of a temperature sensor.
Figure 6:
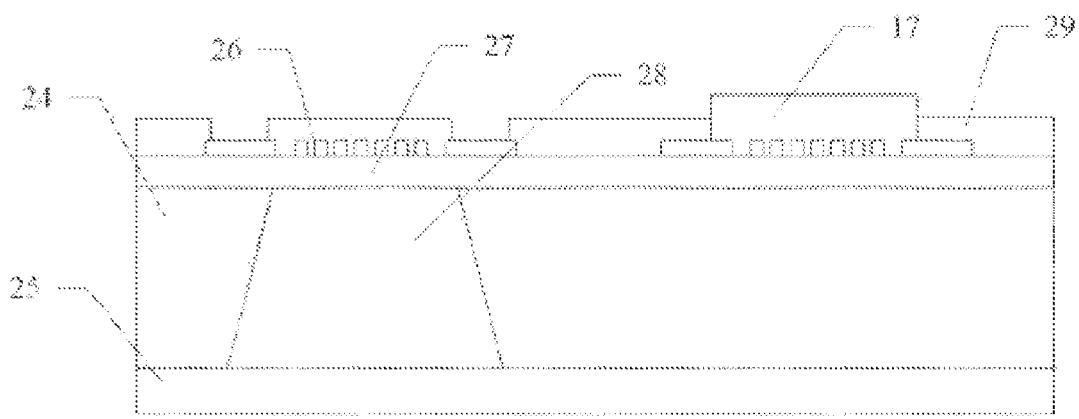
FIG. 6 is a schematic sectional diagram of a sensor chip integrating temperature, humidity and pressure measurements.

The temperature sensor consists of a plurality of electrically connected third resistive elements 13, where a part of the third resistive elements 13 form a resistance adjusting circuit 14, and the electrodes 15 and 16 are connected to the third resistive elements 13 at two ends, as shown in FIG. 5. Moreover, the temperature sensor may also be located on an ASIC chip integrated onto the substrate 24.

The first resistive elements 4-7, the second resistive elements 18-19, the third resistive elements 13, and the electrode plates 20-21 may all be made of the same material, which may be a magnetic sensitive material, metal, metal alloy, semiconductor material, or piezoelectric material, and is generally platinum in this embodiment. The first resistive elements 4-7, the second resistive elements 18-19, and the third resistive elements 13 are serpentine or spiral, and the electrode plates 20-21 are square, rectangular, or circular, but the present invention is not limited to the above materials and shapes. The substrate may be made of a material such as silicon, gallium arsenide, indium phosphide, aluminum oxide, sapphire, aluminum nitride, silicon carbide, silicon nitride, 17-4PH, Ni-Span, Ni-Span C alloy 902 or X17U4 Steel. In this example, the substrate is a silicon substrate.

In this embodiment, the pressure sensor, the humidity sensor, and the temperature sensor are integrated onto the same substrate. According to requirements of actual applications, the same substrate may also have two or one of the three elements integrated thereon, for example, a sensor chip integrating temperature and pressure measurements and a sensor chip integrating temperature and humidity measurements shown in FIG. 2A-2B.

The preparation process of a sensor chip integrating temperature, humidity and pressure measurements shown in FIG. 1 includes the following steps:

(1) Firstly, the surface of a substrate 24 is cleaned, and a layer of elastic thin film 27 having a thickness of about 2000 Å is deposited on the substrate 24, and the elastic thin film 27 may be of a material such as SiN, SiOx, SiOxNy, Al2O3, SiC, 17-4PH, Ni-Span C alloy 902, X17U4 Steel or polyimide. In this embodiment, the elastic thin film 27 is aluminum oxide (Al2O3), and the aluminum oxide thin film has the following two functions: one is serving as a barrier layer when a microcavity is etched at the back, and the other is providing a pressure sensitive film for a pressure measurement sensor.

(2) A layer of sensitive resistance material thin film having a thickness of 500-10000 Å is sputtered on the elastic thin film 27 by using a magnetron sputtering method, and the sensitive resistance material thin film is patterned to form resistive elements 26 for measuring temperature, pressure, and humidity. Here, the patterning to form resistive elements is equivalent to defining function devices by using photolithography and particle beam etching processes. Here, the sensitive resistance material thin film may be a magnetic sensitive material, for example, AMR, GMR, or TMR, may also be a metal and an alloy thereof such as platinum, gold, manganese, nickel, nickel-chromium alloy, nickel-gold alloy, nickel-chromium-silicon alloy, lead-chromium alloy, and platinum-iridium alloy, and may also be a semiconductor material such as doped silicon, polycrystalline silicon, or doped polycrystalline silicon. In this embodiment, the sensitive resistance material thin film is platinum.

(3) Resistances of the resistive elements in a temperature sensor are adjusted to a specified value by using a laser resistance adjusting method, photolithography is carried out by using a lift-off process, and then a passivation layer 29 is deposited above all the resistive elements, the passivation layer 29 is windowed to expose a coverage position for constructing a connection electrode and coating a hygroscopic material, and the passivation layer may be made of a material such as aluminum oxide, silicon dioxide, or silicon nitride.

(4) The back of the substrate 24 is grinded to a suitable thickness, then a microcavity 28 is etched on the back of the substrate 24 in a place on the opposite side pressure sensor's location by using photolithography or a wet etching process, and an aluminum oxide sensitive film in the pressure sensor is disposed right above the microcavity 28. If the microcavity 28 needs to be sealed, a glass sheet 25 may be bonded to the back of the substrate 24, and if a differential pressure needs to be measured, a hole may be opened on the glass sheet 25 in a place corresponding to the microcavity 28, to be in communication with an external to-be-measured voltage.

(5) A hygroscopic material is coated on the front of the substrate 24 in a place corresponding to resistive elements in a humidity sensor, and patterning is implemented by using a lift-off process.

(6) A connection electrode is constructed and wiring is carried out between elements, thereby implementing the whole process.

Working principles of the pressure sensor, the humidity sensor, and the temperature sensor are introduced in the following.

The pressure sensor shown in FIG. 3 generally works by using a resistance strain effect. The resistance strain effect refers to that a mechanical deformation may be caused when an external force is applied to a metal or semiconductor material, and at this point, a resistance value of the metal or semiconductor material may be changed accordingly. For example, it is assumed that a metal resistance wire has a resistivity of $\rho$, a length of $l$, and a sectional area of $S$, and an original resistance of the metal resistance wire is $R=\rho l/S$ when no force is applied. When the metal resistance wire is under tension, a caused resistance change is $dR$:

$$dR/R = dl/l - ds/s + d\rho/\rho = dl/l - 2dR/R + d\rho/\rho \approx (1+2\mu)dl/l = (1+2\mu)\varepsilon$$

where, μ is a Poisson's ratio of the material, ε is a strain, and r is a sectional radius. It can be seen from the above formula that the resistance of the metal wire changes linearly with the strain. In this embodiment, a pressure sensitive film is disposed above the microcavity, 4 strain resistive elements are distributed above the pressure sensitive film, to construct a full bridge, where two resistive elements are located in the middle of the microcavity, and the other two are distributed at edges of the microcavity. When the microcavity is under inconsistent inner and outer pressures, the pressure sensitive film may bend, thereby changing the magnitude of the resistance. The resistive elements located at the edges of the microcavity have large resistance changes due to large deformations, and the resistive elements located in the center position of the cavity have small resistance changes due to small deformations. In this way, a bridge balance is broken, an unbalanced voltage is generated, and the magnitude of the pressure may be determined by measuring the magnitude of the unbalanced voltage. Moreover, the change in temperature may also cause the change in resistance; however, the four resistive elements are identical, and upper and lower bridge arms are distributed symmetrically, such that resistance changes caused by temperature changes are canceled out, and will not affect the final measurement result.

The humidity sensor shown in FIG. 4A generally measures humidity according to a conductivity change caused by different amounts of moisture absorbed by a hygroscopic material when the external humidity changes. When vapor in the air is adsorbed on the hygroscopic material, an internal ionic mobility of the hygroscopic material may change correspondingly under the effect of water molecules, such that conductivities of interdigitated resistors connected to the hygroscopic material are changed, and the humidity of an external environment may be measured according to the changes in conductivity. Resistive elements constructing the interdigitated structure are identical, and thus resistance changes caused by the temperature change may also be canceled out, and will not affect the measurement result.

The humidity sensor shown in FIG. 4B generally measures humidity by using such characteristic that "when the humidity of an environment is changed, a dielectric constant of a humidity sensitive capacitor may be changed, and a capacitance thereof is also changed". Effects on upper and lower electrode plates by the temperature change are canceled out, and the measurement result will not be affected.

The temperature sensor shown in FIG. 5 generally measures the temperature by using a theoretical principle of a resistive temperature sensor, that is, in the vicinity of the Debye temperature, the resistivity of metal is directly proportional to the temperature. For a platinum resistor, in the vicinity of the normal temperature, RT=R0[1+AT+BT2], where R0 and RT are resistances of the platinum resistor at 0° C. and T° C. respectively, A and B are constants, and the value of the temperature may be obtained by measuring the RT.

The pressure sensor, the humidity sensor, and the temperature sensor that are made of an AMR, GMR or TMR material mainly measure changes in pressure, humidity and temperature by using metal material characteristics of the materials.

The temperature, humidity, and pressure are physical quantities to be measured by the sensor chip of the present invention.

The above descriptions are merely preferred embodiments of the present invention, and are not intended to limit the present invention. For persons skilled in the art, the present invention may have various modifications and variations. Any modification, equivalent replacement, improvement or the like made without departing from the spirit and principle of the present invention should fall within the protection scope of the present invention.

The invention claimed is:

1. A sensor chip used for multi-physical quantity measurement, the sensor chip comprising:
   a substrate having opposing sides, the opposing sides including a front side and a back side,
   a temperature sensor, a humidity sensor, and a pressure sensor, located at different positions being integrated onto the front side of the substrate, and
   a microcavity etched into the back side of the substrate opposite a location of the pressure sensor;
   wherein the pressure sensor comprises a Wheatstone bridge formed by electrically connecting an even number of first resistive elements;
   wherein the temperature sensor comprises a plurality of third resistive elements electrically connected in series between two electrodes, wherein a part of the third resistive elements form a resistance adjusting circuit that is configured for use to adjust an overall resistance of the temperature sensor, via a laser resistance adjusting method, to a specified value;
   wherein the humidity sensor comprises an even number of second resistive elements forming an interdigitated structure covered with a hygroscopic material, or, wherein the humidity sensor comprises an upper electrode plate and a lower electrode plate, the electrode plates being provided with a plurality of apertures and a humidity sensitive material being filled between the upper and lower electrode plates;
   wherein at least one of the pressure sensor or the humidity sensor is between elements of the temperature sensor on the front side of the substrate; and
   wherein the first resistive elements, the second resistive elements, the third resistive elements, and the electrode plates are made of the same material.

2. The sensor chip used for multi-physical quantity measurement according to claim 1, wherein the Wheatstone bridge is a half bridge or a full bridge.

3. The sensor chip used for multi-physical quantity measurement according to claim 2,
   wherein the full bridge comprises four first resistive elements, and
   wherein two first resistive elements are correspondingly located at the center of the microcavity and the other two first resistive elements are correspondingly located at two symmetric edges of the microcavity, respectively.

4. The sensor chip used for multi-physical quantity measurement according to claim 2,
   wherein the half bridge comprises two first resistive elements, and
   wherein the two first resistive elements are correspondingly located at the center and the edge of the microcavity, respectively.

5. The sensor chip used for multi-physical quantity measurement according to claim 1, wherein an ASIC chip is integrated onto the substrate, and the temperature sensor is integrated onto the ASIC chip.

6. The sensor chip used for multi-physical quantity measurement according to claim 1, wherein the first resistive elements, the second resistive elements, and the third resistive elements are serpentine or spiral; or, the first resistive elements and the third resistive elements are serpentine or spiral, and the electrode plates are square, rectangular, or circular.

7. The sensor chip used for multi-physical quantity measurement according to claim 1, wherein the material for making the first resistive elements, the second resistive elements, the third resistive elements, and the electrode plates comprises a sensitive resistance material thin film, and the sensitive resistance material thin film has a thickness of 500-10000 Å.

8. The sensor chip used for multi-physical quantity measurement according to claim 1, wherein the humidity sensor comprises the even number of the second resistive elements forming the interdigitated structure.

9. The sensor chip used for multi-physical quantity measurement according to claim 1, wherein both of the pressure sensor and the humidity sensor are between elements of the temperature sensor on the front side of the substrate.

10. The sensor chip used for multi-physical quantity measurement according to claim 1, wherein the elements of the temperature sensor include at least a first string of elements and a second string of elements parallel to the first string of elements.

11. The sensor chip used for multi-physical quantity measurement according to claim 10, wherein the substrate includes opposing first and second edges, and the first and second strings are adjacent to the opposing first and second edges, respectively.

12. A sensor chip used for multi-physical quantity measurement, the sensor chip comprising:
   a substrate having opposing sides, the opposing sides including a front side and a back side,
   a temperature sensor, a humidity sensor, and a pressure sensor, located at different positions being integrated onto the front side of the substrate, and
   a microcavity etched into the back side of the substrate opposite a location of the pressure sensor;
   wherein the pressure sensor comprises a Wheatstone bridge formed by electrically connecting an even number of first resistive elements;
   wherein the temperature sensor comprises a plurality of third resistive elements electrically connected in series between two electrodes, wherein a part of the third resistive elements form a resistance adjusting circuit;
   wherein the humidity sensor comprises an even number of second resistive elements forming an interdigitated structure covered with a hygroscopic material, or, wherein the humidity sensor comprises an upper electrode plate and a lower electrode plate, the electrode plates being provided with a plurality of apertures and a humidity sensitive material being filled between the upper and lower electrode plates;
   wherein at least one of the pressure sensor or the humidity sensor is between elements of the temperature sensor on the front side of the substrate;
   wherein the first resistive elements, the second resistive elements, the third resistive elements, and the electrode plates are made of the same material;
   wherein the elements of the temperature sensor include at least a first string of elements and a second string of elements parallel to the first string of elements; and
   wherein:
   the first electrode is connected to a first end of the first string,
   the second electrode is connected to a first end of the second string, and
   the resistance adjusting circuit is connected between a second end of the first string and a second end of the second string.

13. A sensor chip used for multi-physical quantity measurement, the sensor chip comprising:
   a substrate having opposing sides, the opposing sides including a front side and a back side,
   a temperature sensor, a humidity sensor, and a pressure sensor, located at different positions being integrated onto the front side of the substrate, and
   a microcavity etched into the back side of the substrate opposite a location of the pressure sensor;
   wherein the pressure sensor comprises a Wheatstone bridge formed by electrically connecting an even number of first resistive elements;
   wherein the temperature sensor comprises a plurality of third resistive elements electrically connected in series between two electrodes, wherein a part of the third resistive elements form a resistance adjusting circuit;
   wherein the humidity sensor comprises an even number of second resistive elements forming an interdigitated structure covered with a hygroscopic material, or, wherein the humidity sensor comprises an upper electrode plate and a lower electrode plate, the electrode plates being provided with a plurality of apertures and a humidity sensitive material being filled between the upper and lower electrode plates;
   wherein at least one of the pressure sensor or the humidity sensor is between elements of the temperature sensor on the front side of the substrate; and
   wherein the first resistive elements, the second resistive elements, the third resistive elements, and the electrode plates are made of the same material;
   wherein the elements of the temperature sensor include at least a first string of elements and a second string of elements parallel to the first string of elements; and
   wherein the resistance adjusting circuit is perpendicular to the first and second strings.

* * * * *